United States Patent [19]

Pihl et al.

[11] Patent Number: 5,479,341
[45] Date of Patent: Dec. 26, 1995

[54] ELECTRONIC DATA SECURITY APPARATUS

[76] Inventors: Lawrence E. Pihl, 6 Colonel Wilkins Rd., Amherst, N.H. 03031; William C. Singley, 46 Erik St., Merrimack, N.H. 03054

[21] Appl. No.: 230,611

[22] Filed: Apr. 21, 1994

[51] Int. Cl.[6] ............................................. G06F 19/00
[52] U.S. Cl. .................... 364/184; 361/726; 340/693; 340/542
[58] Field of Search ........................ 364/184–187, 364/130, 400, DIG. 23 MS File; 340/521, 522, 693, 541, 542, 825.31, 825.32; 49/31, 70; 361/679–687, 724, 726, 759, 740, 747, 732; 312/215, 237, 223.1, 223.2, 223.3; 200/50 R, 50 AA; 70/262–265, 77–84, 333 R, 432–440

[56] References Cited

U.S. PATENT DOCUMENTS

| | | | |
|---|---|---|---|
| 4,818,986 | 4/1989 | Bauman | 361/726 X |
| 4,985,695 | 1/1991 | Wilkinson et al. | 340/693 |
| 5,051,725 | 9/1991 | Caccitolo | 340/693 X |
| 5,111,184 | 5/1992 | Heaton et al. | 340/542 |
| 5,136,463 | 8/1992 | Webster | 312/223.1 X |
| 5,321,963 | 6/1994 | Goldman | 340/542 X |

*Primary Examiner*—Joseph Ruggiero
*Attorney, Agent, or Firm*—Davis, Bujold & Streck

[57] ABSTRACT

An electronic data security apparatus for providing adequate protection against adverse external conditions. The apparatus includes an enclosure having a connector interface, an internal control unit contained within the enclosure, data storage devices contained within the enclosure connected to the internal control unit, and an external control unit connected to the internal control unit. The apparatus is capable of sensing adverse external conditions such as fire, water and theft and secure the data storage devices by automatically disconnecting from the external control unit, closing and locking itself off from the outside environment thereby to protect the data storage devices from memory loss.

9 Claims, 6 Drawing Sheets

ELECTRONIC DATA SECURITY APPARATUS

This invention relates to an electronic data security apparatus for providing adequate protection against adverse external conditions. In particular, though not exclusively, the apparatus comprises an enclosure to secure electronic data storage devices that closes upon receipt of a signal indicating an adverse external condition such as fire, water and theft. The enclosure is accessible by operators, but upon receipt of a signal indicating an adverse condition, closes and locks thereby to prevent access.

Attention is called to U.S. Pat. No. 4,985,695 to Wilkinson et al. which relates to a computer security device which utilizes a compartmentalized housing for storage of various computer equipment and further provides protection from unauthorized attempts to move the computer.

BACKGROUND OF THE INVENTION

In today's information society, individuals, academia, government and industry have come to rely on access to and storage of vast amounts of electronic information. With an ever increasing generation of such information comes the need to protect it from loss due to, for example, fire, theft and memory loss. Indeed, corporations go to great length to protect this information to protect, for example, their confidential information such as trade secrets, industry forecasts, employee files and the like.

The current practice for large organizations is to provide a separate computer room in which to house electronic data storage equipment. This computer room is typically protected from fire hazards through the use of halon systems which can be extremely expensive. Further, the computer room usually has a vault located adjacent to the room where electronic data stored on electronic media such as magnetic tapes can be stored during non-use. Of course, this requires personnel to continually move the magnetic tapes from the vault and install the tape in the electronic device capable of reading the tape thereby to allow access to the information stored on the tape by an authorized user. Once the user no longer needs this particular tape, the tape is returned to the vault for safe-keeping.

On the other end of the spectrum is the desk top computer, generally referred to as a "PC". There are current devices available, or at least disclosed, which addresses the security issue as it relates to "PCs". These devices tend to protect, not only data which is stored on floppy disks, but also the entire "PC" itself. However, the "PC" along with the security device is capable of being removed to another area, although an alarm is sounded.

The problem arises, however, in the intermediate situation where, for example a firm is operating on a local area network. These firms generally cannot afford the expense associated with the installation and use of a secured, fire protected computer room and vault with associated support personnel to allow access to the stored electronic data. These firms are also in need of a storage system which does not rely on protecting the individual work station (e.g., the "PC"), but rather the electronic data storage device. In a local area network situation, for example, the data is typically stored on a host system located at a remote location from the "PC". The security device used for the "PC" application will generally not be adequate because the host system with related electronic storage equipment is too large to fit within the "PC" style security device.

The present invention overcomes the problems in the previous practice by utilizing an apparatus which can provide access to the data by authorized personnel but upon receiving a signal from a remote sensor of an adverse condition effectively seals off the electronic storage equipment from the outside environment thereby to prevent data loss.

OBJECTIVES OF THE INVENTION

Accordingly, it is an objective of the present invention to provide a storage device for protecting electronic data from adverse external conditions such as fire, heat, water, moisture, magnetic fields, static electricity, vibration, motion, theft, tampering, unauthorized use, dust, power interruption, light, and sound.

Another objective of the invention is to provide a security device which does not require personnel to manage the access of the data.

These and still further objectives will become apparent hereinafter.

SUMMARY OF THE INVENTION

In accordance with the present invention, the foregoing objectives are achieved in an electronic data security apparatus for providing adequate protection against adverse external conditions comprising an enclosure having a closeable opening and connector interface; an internal control unit contained within said enclosure; at least one data storage device contained within said enclosure connected by way of said interface; an external control unit connected by the connector interface to said internal control unit; a disconnect means for disconnecting the interface; and an actuating means for automatically disconnecting the interface and closing said closeable opening of said enclosure.

Also in accordance with the present invention, the foregoing objectives are achieved in an electronic data security apparatus for providing adequate protection against adverse external conditions that includes an enclosure having a closeable opening and an enclosure electrical connector interface; an internal control unit contained within the enclosure; data storage devices also contained within the enclosure and connected to the internal control unit; an external control unit having an external control unit connector interface connected to the internal control unit; a disconnect assembly located inside the enclosure which is used for disconnecting electronic communication between the internal control unit and the external control unit; and an actuating assembly to close the enclosure's opening.

Also in accordance with the present invention, the foregoing objectives are achieved in an electronic data security apparatus for providing adequate protection against adverse external conditions comprising an enclosure having a door and an enclosure electrical connector interface, said enclosure comprises a material sufficient to provide protection against at least one of fire, heat, water, moisture, magnetic fields, static electricity, vibration, motion, theft, tampering, unauthorized use, dust, power interruption, light, and sound; an internal control unit, a power supply and a plurality of data storage devices contained within said enclosure, said internal control unit controls transfer of data from an external control unit to said data storage devices; said external control unit has a plurality of adverse external condition sensors and an external control unit connector interface, said external control unit receives signals from said adverse external condition sensors and transmits a further signal to said internal control unit to initiate a closing sequence; a disconnect means for disconnecting electronic communication between said internal control unit and external control unit, said disconnect means is contained within said enclosure, said disconnect means comprises an electromechanical disconnect assembly attached to said enclosure electrical connector interface, said electromechanical disconnect assembly causes said enclosure electrical connector interface to disconnect from said external control unit connector interface upon receipt of a signal from said internal control unit; and, an actuating means for automatically closing said door of said enclosure, said actuating means comprises an actuator assembly connected to said door and said enclosure capable of closing said door upon receipt of a signal from said internal control unit, said actuator assembly disengages from said door upon closure to allow door to be opened manually without the use of said assembly.

Also, according to the invention, there is provided a method for securing electronic data from adverse external conditions comprising the steps of (a) placing an internal control unit and plurality of data storage devices within an enclosure, said enclosure being capable of providing protection against said adverse external conditions; (b) sensing the presence of said adverse external conditions; (c) sending a signal to said internal control unit; and, (d) performing a closing sequence.

BRIEF INTRODUCTION TO THE DRAWINGS

The invention will now be described, by way of example, with reference to accompanying drawings, in which.

DETAILED DESCRIPTION OF THE INVENTION

Figure 1:
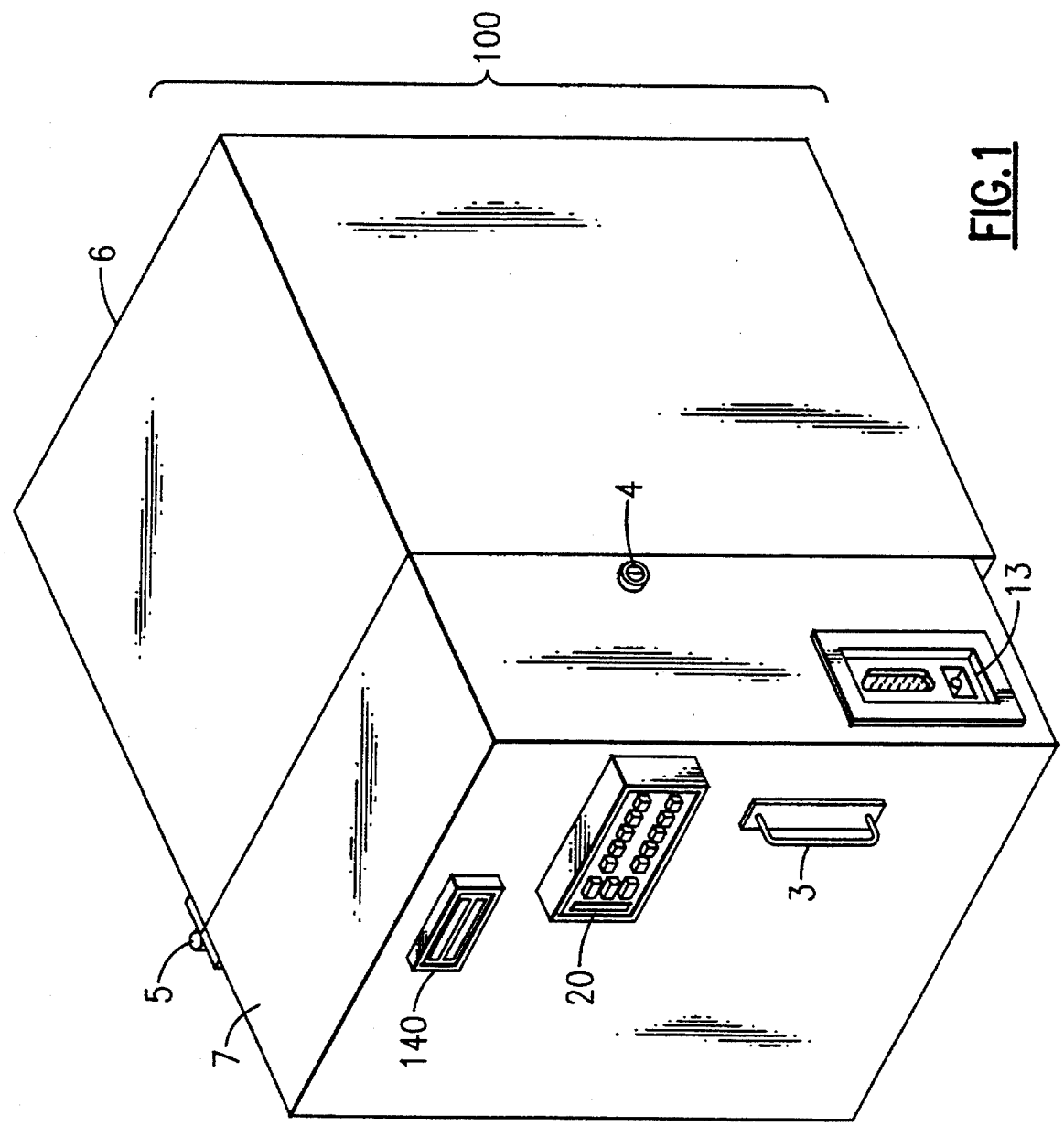
FIG. 1 is a perspective view of the electronic data security apparatus of this invention.

Turning now to FIG. 1, an electronic data security apparatus 100 is shown constructed in accordance with the present inventive concepts. The shroud 6 is hinged to a shroud door 7 by means of hinge 5. The shroud door 7 may be locked to shroud 6 with shroud lock 4. Located on the shroud door 7 is keypad 20, handle 3, status indicator 140 and shroud connector interface 13. The shroud 6 and shroud door 7 is typically constructed of sheet metal, but other strong material may be used.

Figure 2:
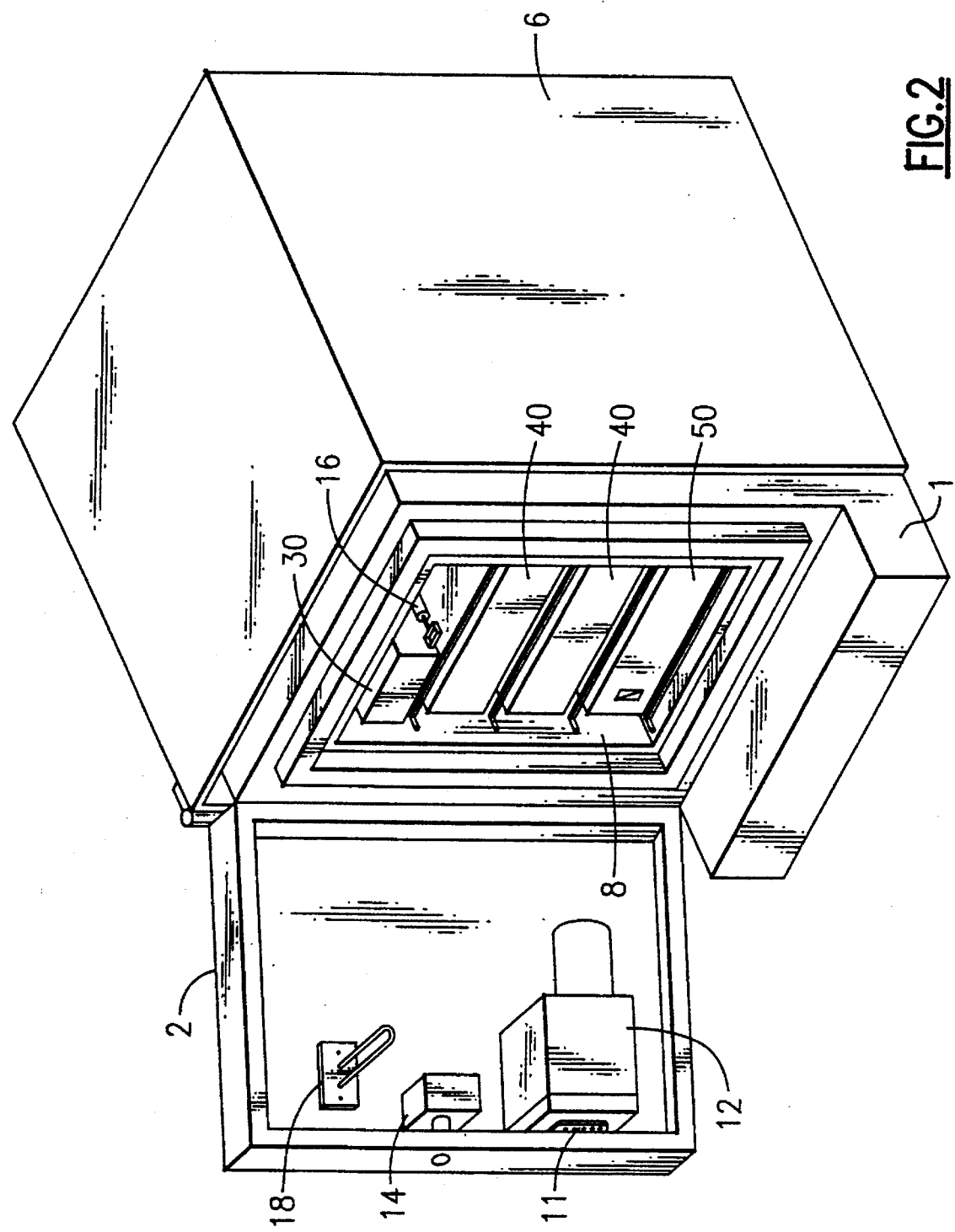
FIG. 2 is a perspective view of the electronic data security apparatus with shroud door removed.

The electronic data security apparatus 100 is shown in FIG. 2 with the shroud door 7 removed. Located within the shroud 6 is an enclosure 1 capable of withstanding adverse external conditions. The enclosure 1 is typically a modified fireproof safe, but other suitable enclosures may be used. Enclosure 1 has a volume of space 8 sufficient to allow the placement of various electronic equipment such as an internal control unit 30, data storage devices 40 and a power supply 50. Also contained within space 8 is a door actuator assembly 16 used to close door 2.

Located on door 2 is latch 18, digital lock 14, electromechanical disconnect assembly 12 and enclosure electrical connector interface 11. Latch 18 engages door actuator assembly 16. To close the door 2, a signal is sent from the internal control unit 30 to the door actuator assembly 16. The door actuator assembly 16 then pulls on latch 18 to further pull door 2 closed. Once closed, the door actuator assembly 16 reverses, but the door 2 remains closed because the door actuator assembly 16 is merely slidably attached to latch 18. Thus, when an operator wishes to open the door 2 manually, it may be opened easily and without the need of electric power thereby obviating the need for the door actuator assembly 16 to open the door 2. The door actuator assembly 16 and latch 18 will be further described with reference to FIG. 5. Also, the electromechanical disconnect assembly will further be described with reference to FIG. 4.

Figure 3:
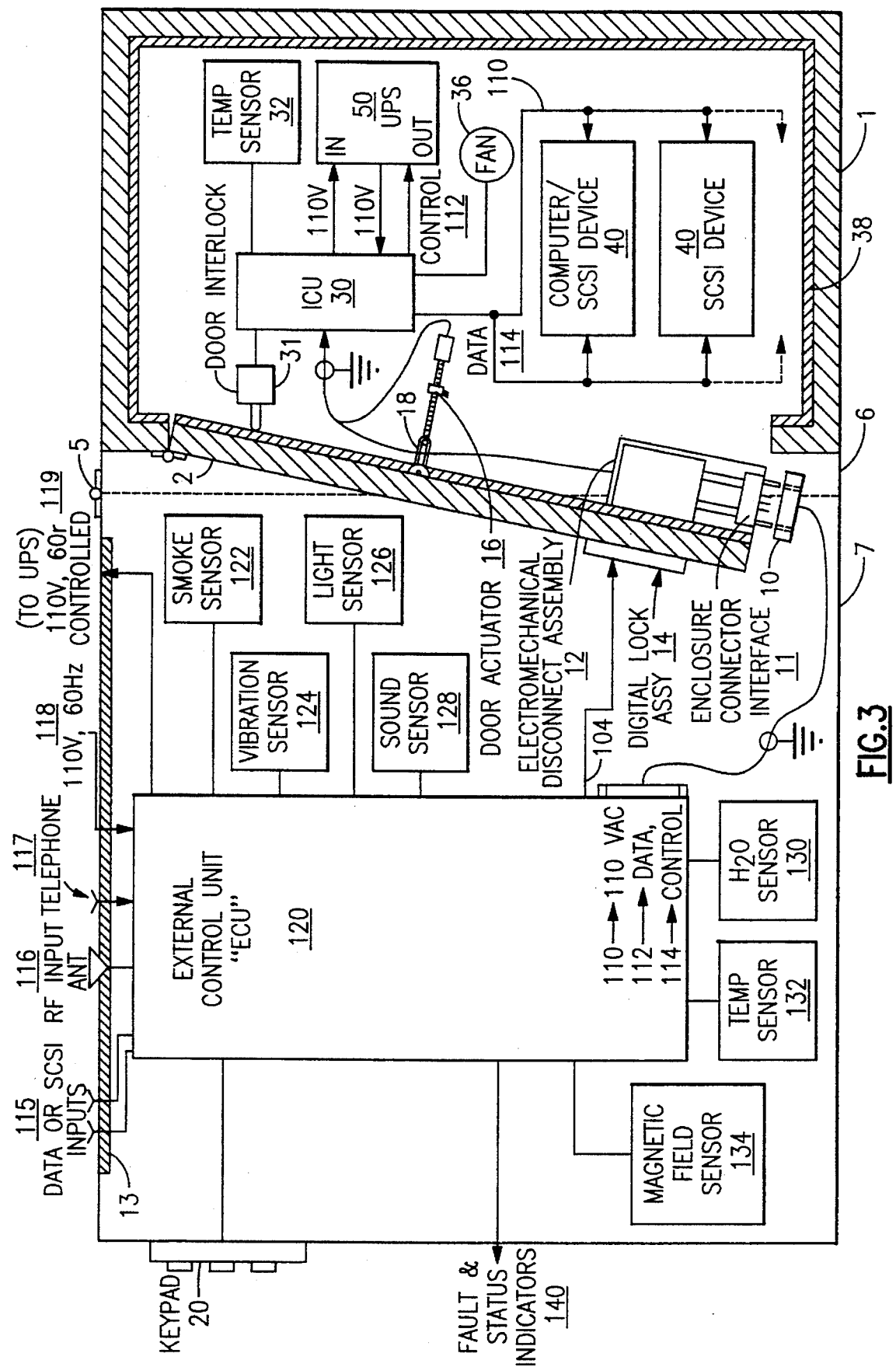
FIG. 3 is a diagrammatic representation of the electronic data security apparatus.

Referring now to FIG. 3, a detail of the operating sequence is described. Under normal operating conditions, various inputs such as data inputs 115, RF antenna input 116, telephone input 117, power input 118 and backup power input 119 are input through shroud connector interface 13 into the external control unit 120 located within shroud 6 and shroud door 7. The external control unit then passes these various inputs through external control unit connector interface 10, through the enclosure electrical connector interface 11 which is connected to the electromechanical disconnect assembly 12 into the internal control unit 30. Data is then passed on to the data storage devices 40 for storage.

During a soft shutdown, an operator manually keys in or appropriate automatic activation starts an authorization sequence in the keypad 20, which is connected to external control unit 120. This causes the external control unit 120 to send a signal to the internal control unit 30 to safely shutdown the data storage devices 40. Once complete, the internal control unit 30 sends a signal to both the electromechanical disconnect assembly 12 and the door actuator assembly 16. The electromechanical disconnect assembly 12 disconnects enclosure electrical connector interface 11 from the external control unit connector interface 10 as will be described with reference to FIG. 4. The floor actuator assembly 16 then causes the door 2 to close as will be described with reference to FIG. 5. Once the door 2 is closed, the door interlock 34 signals the internal control unit that the door 2 is closed. The internal control unit 30 then signals the door actuator assembly 16 to reverse operation thereby to allow later manual door opening as will be described with reference to FIG. 5. Once door 2 is closed, digital lock 14, which is controlled from the external control unit 120 by way of digital lock control line 104, locks the door 2 to enclosure 1 thereby to provide a secure enclosure capable of protecting the internal components from various external adverse conditions such as fire, heat, water, moisture, magnetic fields, static electricity, vibration, motion, theft, tampering, unauthorized use, dust, power interruption, light, sound, and sounding of building fire alarm. The magnetic field protection shield 38 located adjacent to the interior wall of enclosure 1 provides adequate protection of data loss due to high intensity magnetic fields present outside the enclosure 1. An enclosure temperature sensor 32, located within the enclosure 1 allows the internal control unit 30 to turn on a fan 36 in the event of needed cooling to protect the various components. Once the enclosure is safely closed, the external control unit 120 provides an indication of such event through the status indicator 140 located on the shroud door 7.

During a hard shutdown, inputs from the various adverse external condition sensors such as smoke sensor 122, vibration sensor 124, light sensor 126, sound sensor 128, water sensor 130, temperature sensor 132 and magnetic field sensor 134 provides a signal to the external control unit 120 of an event such as fire, heat, water, moisture, magnetic fields, static electricity, vibration, motion, theft, tampering, unauthorized use, dust, power interruption, light, sound, and sounding of building fire alarm. Upon receipt of such signal, the external control unit 120 sends a signal to the internal control unit 30. The events that follow parallel the soft shutdown sequence. The internal control unit 30 sends a signal to both the electromechanical disconnect assembly 12 and the door actuator assembly 16. The electromechanical disconnect assembly 12 disconnects enclosure electrical connector interface 11 from the external control unit connector interface 10 as will be described with reference to FIG. 4. The door actuator assembly 16 then causes the door 2 to close as will be described with reference to FIG. 5. Once the door 2 is closed, the door interlock 34 signals the internal control unit that the door 2 is closed. The internal control unit 30 then signals the door actuator assembly 16 to reverse operation thereby to allow later manual door opening as will be described with reference to FIG. 5. Once door 2 is closed, digital lock 14 locks the door 2 to enclosure 1 thereby to provide a secure enclosure capable of protecting the internal components from various external adverse conditions such as fire, heat, water, moisture, magnetic fields, static electricity, vibration, motion, theft, tampering, unauthorized use, dust, power interruption, light, sound, and sounding of building fire alarm.

Figure 4:
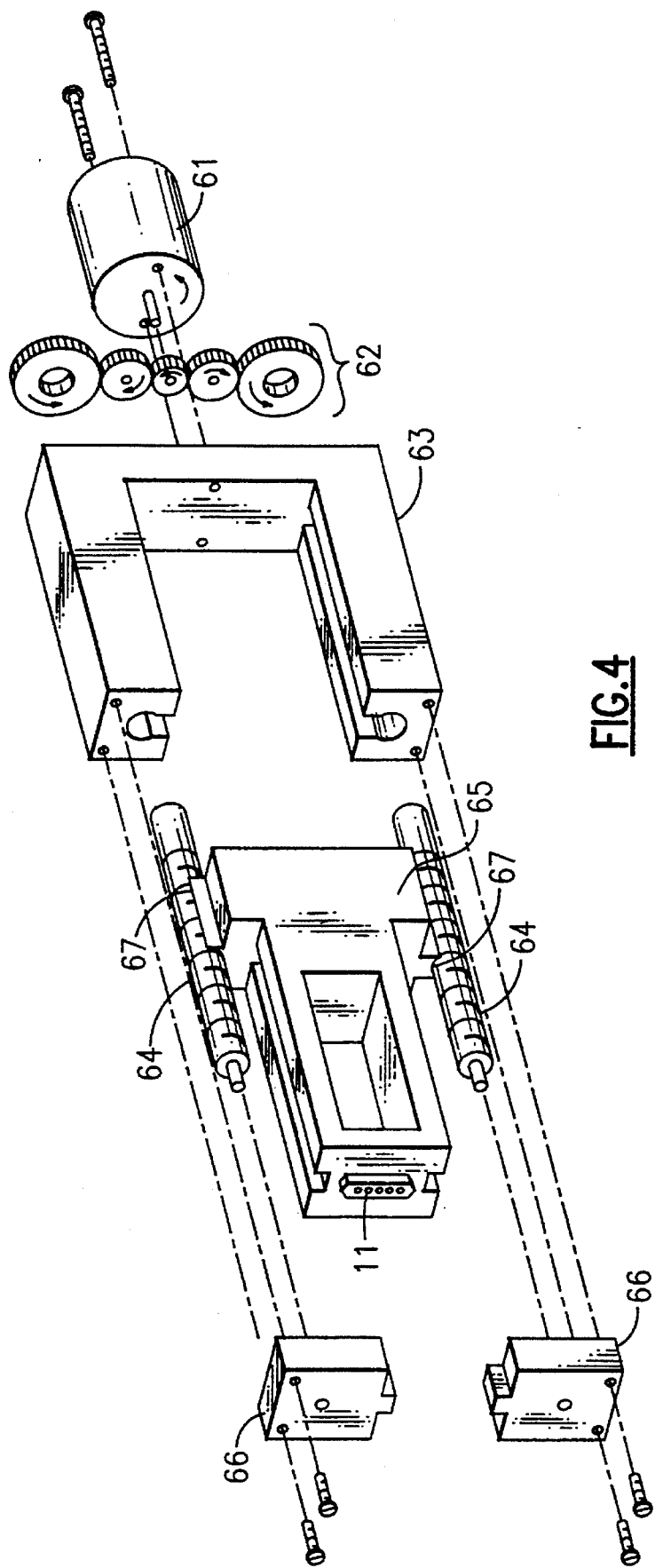
FIG. 4 is a diagrammatic exploded view of the electromechanical disconnect assembly.

FIG. 4 shows the electromechanical disconnect assembly 12 in an exploded view. A stepper motor 61, mounted to a frame 63, drives a gear train 62 located between the stepper motor 61 and frame 63. The gear train 62 is attached to a screw 64 supported within the frame 63. A second screw 64 is also supported within the frame 63 opposite the first screw 64. The screws 64 are attached the connector frame 65 by way of partial nuts 67 located on the connector frame 65. End caps 66 are used to support the free end of the screws 64. Upon a signal to disconnect from the internal control unit 30, the stepper motor 61 turn in a direction sufficient to cause the screws 64 to pull the connector frame 65 in a direction toward the stepper motor 61. The result is that the enclosure connector interface 11 is disconnected from the external control unit connector interface 10. When the internal control unit 30 sends a signal to the stepper motor 61 to re-connect, the sequence of events described above is reversed. That is, stepper motor 61 turns in an opposite direction causing worm 64 to drive the connector frame 65 away from stepper motor 61 thereby to re-connect enclosure electrical connector interface 11 with external control unit connector interface 10.

Figure 5:
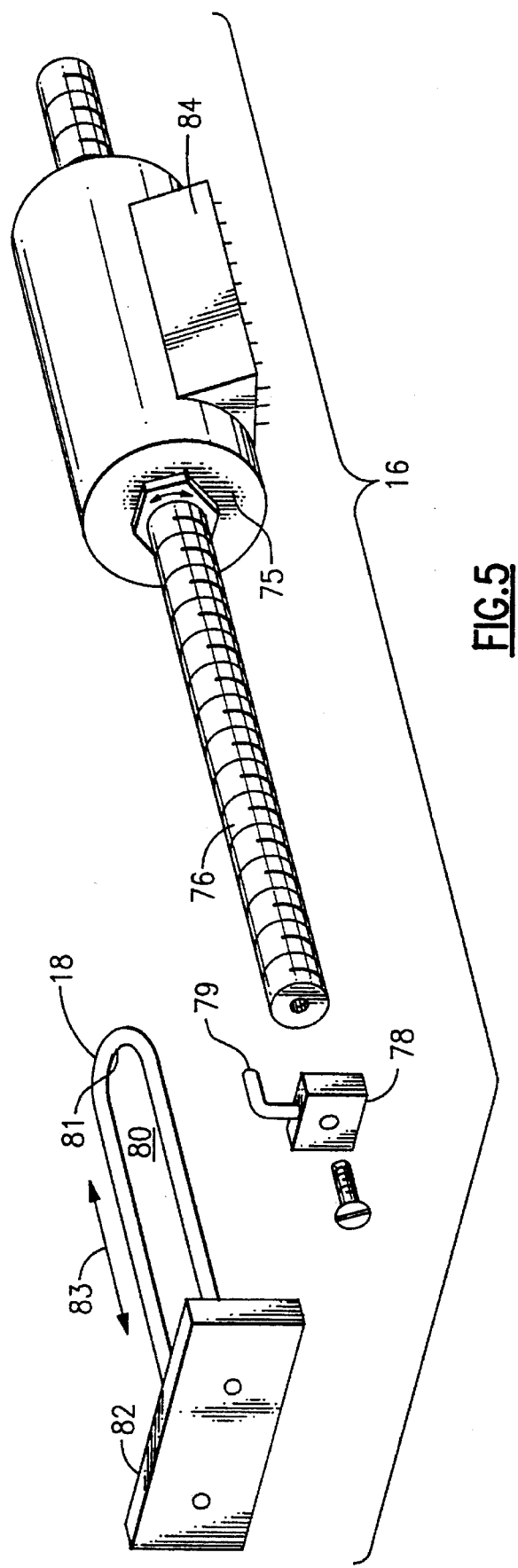
FIG. 5 is a diagrammatic exploded view of the door actuator assembly.

Referring to FIG. 5, is an exploded view of the door actuator. Stepper motor 75 is attached to rotate a main screw 76. The stepper motor 75 is fixed to the enclosure 1 within space 8 and attached by, for example, mounting bracket 84. The free end of main screw 76 is attached to end cap 78 having a tab 79. Tab 79 is slidably attached to latch 18 within space 80 of latch 18. When the door 2 is in the open position, tab 79 contacts latch end 81. Upon receipt of a signal from the internal control unit 30, the stepper motor 75 turns in a direction sufficient to cause the main screw 76, end cap 78 and tab 79 to pull on latch end 81 thereby closing door 2. Once the door 2 is closed, a further signal is sent to stepper motor 75 to reverse such that the main screw 76, end cap 78 and tab 79 is driven away from the stepper motor 75. Since there is an open space 80 within latch 18, end cap 78 with tab 79 moves within space 80 away from latch end 81, toward mounting end 82. The result is that now door 2 can be opened without the need of power supplied to the stepper motor 75. That is, the door 2 can now be manually pulled open by an amount equal to the distance between mounting end 82 and latch end 18 of space 80 located within latch 18.

Figure 6:
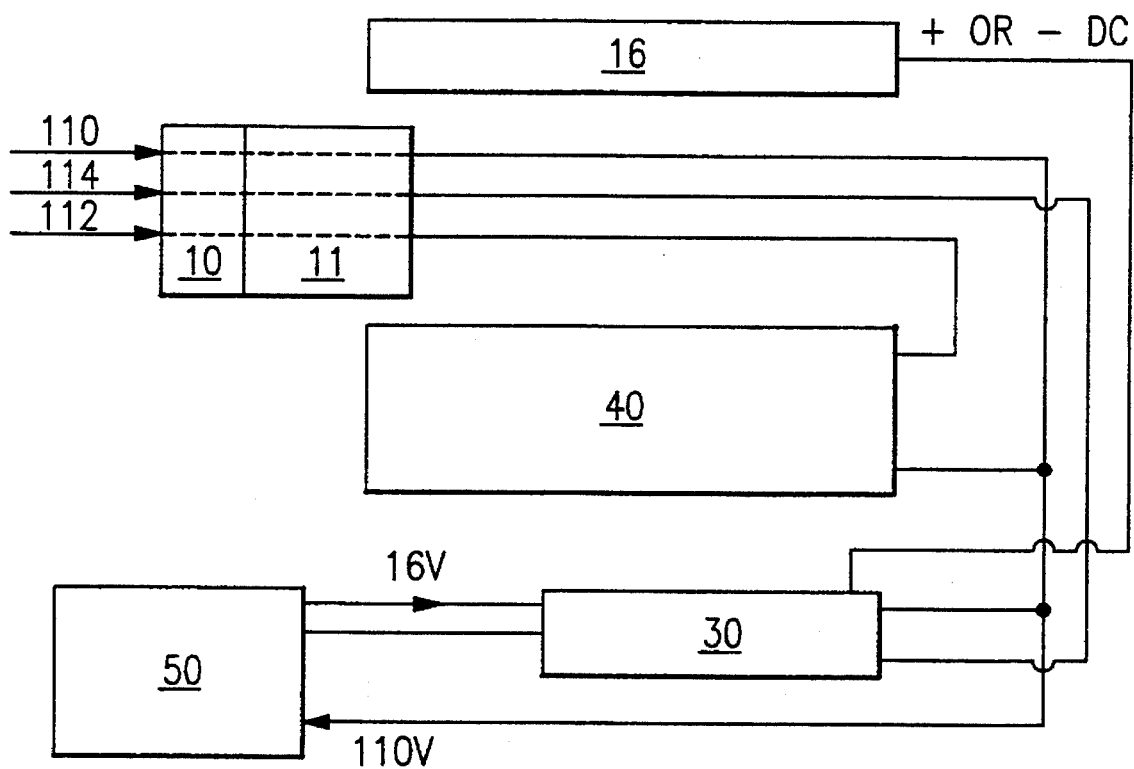
FIG. 6 is a block diagram of the internal connections of the electronic data security apparatus.

Referring to FIG. 6, there is shown a block diagram of the internal connections between the various components within the space 8 and on door 2 namely the interconnections between the enclosure electrical connector interface 11, the door actuator assembly 16, the data storage devices 40, the power supply 50 and the internal control unit 30.

There are three inputs through the external control unit connector interface 10 and enclosure electrical connector interface 11:110 represents the power line, 114 represents the control line, and 112 represents the data line. The data line 112 is connected directly to the data storage device 40. The control line 114 is connected to the internal control unit 30. The door actuator assembly 16 is connected and controlled by internal control unit 30. The power line 110 is connected to the power supply 50, the internal control unit 30 and the data storage devices 40. The power supply 50 output is also connected directly to the internal control unit 30. The power to the power supply 50 output is used by the internal control unit to power door actuator 16.

Since certain changes may be made in the above without departing from the spirit and scope of the invention herein involved, it is intended that all matter contained in the above description or shown in the accompanying drawings shall be interpreted merely as examples illustrating the inventive concept herein and shall not be construed as limiting the invention.

Wherefore, we claim:

1. An electronic data security apparatus for providing adequate protection against adverse external conditions comprising:

an enclosure having a closeable opening and connector interface;

an internal control unit contained within said enclosure;

at least one data storage device contained within said enclosure connected by way of said connector interface;

an external control unit connected by said connector interface to said internal control unit;

a disconnect means for disconnecting said connector interface; and an actuating means for automatically disconnecting said connector interface and closing said closeable opening of said enclosure.

2. An electronic data security apparatus for providing adequate protection against adverse external conditions comprising:

an enclosure having a closeable opening and an enclosure electrical connector interface;

an internal control unit contained within said enclosure;

a plurality of data storage devices contained within said enclosure connected to said internal control unit;

an external control unit having an external control unit connector interface connected to said internal control unit;

a disconnect means for disconnecting electronic communication between said internal control unit and external control unit, said disconnecting means being contained within said enclosure; and, an actuating means for automatically closing said closeable opening of said enclosure.

3. The apparatus according to claim 2 wherein said external control unit comprises adverse external condition sensors, said external control unit receives signals from said external condition sensors and transmits a further signal to said internal control unit to initiate a closing sequence, and said adverse external condition sensors sense adverse external conditions.

4. The apparatus according to claim 3 wherein a power supply provides power to said internal control unit in the event of external power interruption.

5. The apparatus according to claim 2 wherein said disconnecting means comprises an electromechanical disconnect assembly attached to said enclosure electrical connector interface, and said electromechanical disconnect assembly causes said enclosure electrical connector interface to disconnect from said external control unit connector interface upon receipt of a signal from said internal control unit.

6. The apparatus according to claim 2 wherein said actuating means comprises an actuator assembly connected to said closeable opening and said enclosure to close said closeable opening upon receipt of a signal from said internal control unit, said actuator assembly disengages from said closeable opening upon closure to allow said closeable opening to be opened manually without the use of said actuator assembly.

7. An electronic data security apparatus for providing adequate protection against adverse external conditions comprising:

an enclosure having a door and an enclosure electrical connector interface, said enclosure comprising a material sufficient to provide protection against at least one of fire, heat, water, moisture, magnetic fields, static electricity, vibration, motion, theft, tampering, unauthorized use, dust, power interruption, light, and sound;

an internal control unit, a power supply and a plurality of data storage devices contained within said enclosure, said internal control unit controlling transfer of data from an external control unit to said data storage devices;

said external control unit having a plurality of adverse external condition sensors and an external control unit connector interface, said external control unit receiving signals from said adverse external condition sensors and transmitting a further signal to said internal control unit to initiate a closing sequence;

a disconnect means for disconnecting electronic communication between said internal control unit and external control unit, said disconnect means being contained within said enclosure, said disconnect means comprising an electromechanical disconnect assembly attached to said enclosure electrical connector interface, said electromechanical disconnect assembly causing said enclosure electrical connector interface to disconnect from said external control unit connector interface upon receipt of a signal from said internal control unit; and, an actuating means for automatically closing said door of said enclosure, said actuating means comprising an actuator assembly connected to said door and said enclosure to close said door upon receipt of a signal from said internal control unit, said actuator assembly disengaging from said door upon closure to allow said door to be opened manually without the use of said assembly.

8. A method for securing electronic data from adverse external conditions comprising the steps of:

(a) placing an internal control unit and plurality of data storage devices within an enclosure, said enclosure providing protection against said adverse external conditions;

(b) sensing the presence of said adverse external conditions;

(c) sending a signal to said internal control unit; and, (d) performing a closing sequence by at least automatically closing said enclosure thereby isolating said internal control unit and plurality of data storage devices within said enclosure from said adverse external conditions.

9. The method for securing electronic data from adverse external conditions according to claim 8 said closing sequence step further comprising the steps of:

(a) sending a signal to a disconnecting assembly;

(b) disconnecting electronic communication between said internal control unit and an external control unit having an external control unit connector interface, said disconnecting step comprising an electromechanical disconnect assembly attached to an enclosure electrical connector interface, said electromechanical disconnect assembly causing said enclosure connector interface to disconnect from said external control unit connector interface upon receipt of a signal from said internal control unit; and, (c) sending a signal to a door actuator assembly, said door actuator assembly comprising a stepper motor connected to said door and said enclosure whereby closing of said door occurs upon receipt of a signal from said internal control unit, said door actuator assembly disengaging from said door upon closure to allow said door to be opened manually without the use of said assembly.

* * * * *